(12) United States Patent
Shirakawa et al.

(10) Patent No.: US 7,296,561 B2
(45) Date of Patent: Nov. 20, 2007

(54) ENGINE CONTROL APPARATUS

(75) Inventors: Takashi Shirakawa, Kanagawa (JP);
Yasutaka Ishibashi, Kanagawa (JP);
Hikari Todoroki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 34 days.

(21) Appl. No.: 11/318,045

(22) Filed: Dec. 23, 2005

(65) Prior Publication Data
US 2006/0137660 A1 Jun. 29, 2006

(30) Foreign Application Priority Data
Dec. 27, 2004 (JP) ............... 2004-377517

(51) Int. Cl.
*F02M 51/00* (2006.01)
*F02M 25/07* (2006.01)
*F02B 47/08* (2006.01)
*F02B 33/44* (2006.01)

(52) U.S. Cl. ............... 123/493; 123/568.21; 60/602; 60/605.2

(58) Field of Classification Search ........... 123/568.11, 123/568.13–568.15, 568.16, 568.21, 568.26–568.3, 123/481, 325, 493, 198; 60/602, 605.2; 701/108
See application file for complete search history.

(56) References Cited

U.S. PATENT DOCUMENTS

| | | |
|---|---|---|
| 4,311,123 A | 1/1982 | Glockler et al. |
| 4,459,960 A * | 7/1984 | Ueno et al. ............... 123/198 F |
| 6,851,258 B2 | 2/2005 | Kawashima et al. |
| 7,047,742 B2 * | 5/2006 | Kono et al. ............... 60/605.2 |
| 2006/0016180 A1 * | 1/2006 | Tomita et al. ............... 60/297 |

FOREIGN PATENT DOCUMENTS

| | | | | |
|---|---|---|---|---|
| EP | 1 004 760 | | 5/2000 | |
| EP | 1 382 812 | | 1/2004 | |
| EP | 1 571 316 | | 9/2005 | |
| JP | 04143448 A | * | 5/1992 | ............ 123/568.27 |
| JP | 04284147 A | * | 10/1992 | ............ 123/567.27 |
| JP | H0669331 | | 9/1994 | |

OTHER PUBLICATIONS

European Patent Search for 05257837.4.

* cited by examiner

*Primary Examiner*—Willis R. Wolfe, Jr.
(74) *Attorney, Agent, or Firm*—Rader, Fishman & Grauer PLLC

(57) ABSTRACT

In order to prevent the generation of surge noise or other abnormal phenomena during deceleration of a vehicle, the present engine control apparatus comprises a turbo-supercharger driven by exhaust energy of the engine, at least one of an $NO_x$ trap catalyzer and a DPF mounted in the exhaust path of the engine for purifying the exhaust, an EGR path interconnecting the exhaust path and the inlet path of the engine, an EGR valve for adjusting the cross-section of the duct of the EGR path, means for detecting deceleration, and a fuel cutoff control means that, if predetermined conditions are satisfied, effects fuel cutoff control to reduces the rate of fuel injection, wherein the EGR valve is closed during the period of vehicle deceleration.

8 Claims, 11 Drawing Sheets

ENGINE CONTROL APPARATUS

RELATED APPLICATIONS

The disclosures of Japanese Patent Application No. 2004-377517, filed Dec. 27, 2004, and Japanese Laid Open Patent No. 2003-336520, filed May 20, 2002 and published Nov. 28, 2003, including their specifications, drawings and claims, are incorporated herein by reference in their entireties.

FIELD

Described herein is an engine control apparatus, and in particular, an apparatus for control of an engine during deceleration.

BACKGROUND

A turbo-supercharger driven by a turbine provided in the path of engine exhaust is known to improving the output of an engine.

The efficiency of the compressor of such a turbo-supercharger can be, as is commonly known, indicated by parameters comprising the pressure ratio of the top and bottom flow of the compressor, and the gas flow rate that passes the compressor. When the pressure ratio deviates from the appropriate pressure ratio range (normal operation range) that corresponds to the gas flow rate, and enters an abnormal operation range, undesirable phenomena, such as surging, choking or over-speeding of the turbine, are experienced, whereby the operating condition of the compressor should be established so as not to enter the abnormal operation range.

For example, when sudden deceleration is effected by releasing the accelerator pedal during high-speed steady driving, the fuel injection rate is decreased, thereby causing a rapid reduction in the exhaust flow rate. During this time, the operating condition of the compressor sometimes may enter the abnormal operation range, thereby generating surging.

In addition, an EGR (Exhaust Gas Recirculation) device for introducing only part of the exhaust into the inlet path according to the driving conditions, is known, in which a pipe connecting between the exhaust path and an inlet path (EGR pipe) and an EGR valve that controls the flow rate of the EGR pipe are provided.

In such an EGR device, the exhaust is introduced to the inlet path due to the differential pressure between the exhaust path and the inlet path, and then the aperture (open degree) of the EGR valve is adjusted so that the amount of EGR increases when the driving conditions shift to the low load side. However, when a vehicle speed is reduced in the normal driving condition so that the fuel is reduced by releasing the accelerator pedal, the exhaust pressure decreases, and therefore, the EGR gas may backflow via the EGR pipe into the turbine so that it may cause a surge noise.

SUMMARY OF THE INVENTION

The present engine control apparatus of a vehicle having an EGR pipe and a post-exhaust process apparatus prevents such surging during deceleration that accompanies a reduction of the fuel.

The present engine control apparatus comprises a turbo-supercharger driven by the exhaust energy of the engine, an EGR path connecting the exhaust path and the inlet path of the engine, an EGR valve for adjusting the cross-section of the duct of the EGR path, a means for detecting deceleration of the vehicle, and a fuel cutoff control unit for detecting deceleration of the vehicle, and the fuel cutoff control is activated to reduce the rate of the fuel injection, the EGR valve is closed during the period of vehicle deceleration.

The EGR valve is closed during the deceleration period to prevent a backflow of the EGR gas in the EGR path due to the sudden reduction of the exhaust pressure caused by the fuel cutoff control during the deceleration period, or to prevent the flow of new intake air from the inlet path to the exhaust path via the EGR path when the exhaust pressure falls below the intake air pressure. Surging and surging noise during the deceleration period can thus be prevented.

BRIEF DESCRIPTION OF THE DRAWINGS

For a more complete understanding of the present engine control apparatus, and the advantages thereof, reference is now made to the following description taken in conjunction with the accompanying drawings, in which.

DETAILED DESCRIPTION OF THE ILLUSTRATED EMBODIMENTS

While the claims are not limited to the illustrated embodiments, an appreciation of various aspects of the apparatus is best gained through a discussion of various examples thereof.

Figure 1:
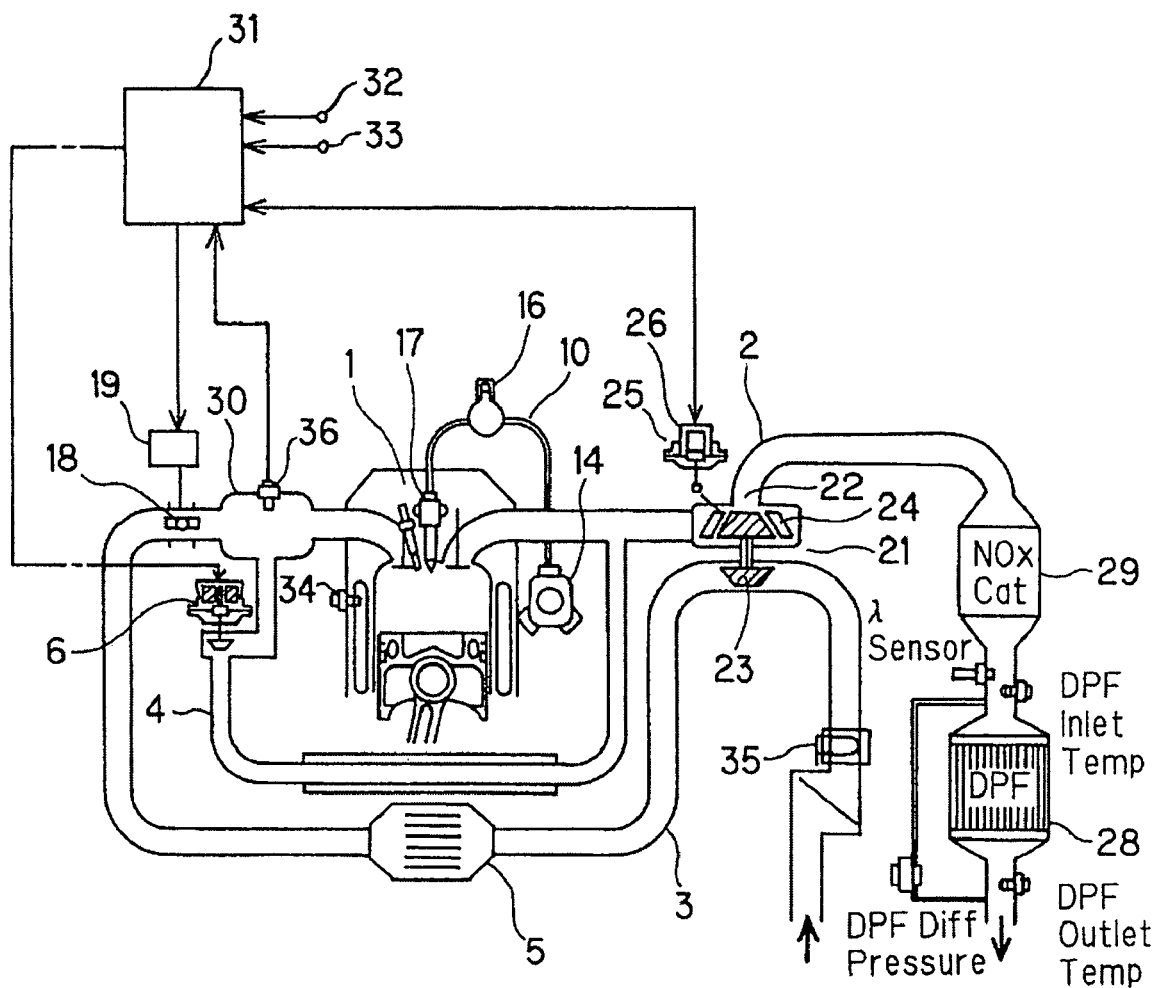
FIG. 1 is a system diagram of an embodiment of the present control apparatus.

FIG. 1 is a schematic view of an embodiment of an engine (diesel engine). The engine 1 is provided with an exhaust path 2 and an inlet path 3. An EGR path 4 interconnects the exhaust path 2 and the inlet path 3. An intercooler 5 cools high temperature intake air compressed by a compressor of a turbo-supercharger, described below.

The EGR path 4 is provided with a diaphragm-type EGR valve 6 that operates in response to control pressure from a pressure control valve (not shown). The pressure control valve is driven by a duty control signal from an engine controller 31, whereby the predetermined EGR rate is obtained according to the driving conditions.

The engine 1 is provided with a common rail-type fuel injection device 10 as a fuel supplying means. This fuel injection device 10 principally comprises a fuel tank (not shown), a supply pump 14, a common rail (accumulator) 16, and a nozzle 17 provided for each cylinder, whereby after the fuel pressurized by the supply pump 14 is temporarily accumulated in the accumulator 16, it is distributed to the nozzles 17.

The nozzle (fuel injection valve) 17 comprises a needle valve, a nozzle chamber, a fuel supply path to the nozzle chamber, a retainer, a hydraulic piston, a return spring, etc. A three-way valve (not shown) is interposed in the fuel supply path to the hydraulic piston. When the three-way valve (an electromagnetic valve) is closed, the needle valve is in a seated position, and when the three-way valve is opened, the needle valve is raised so that the fuel is injected from the discharge hole at the tip of the nozzle. In other words, the earlier the injection starting time of the fuel due to the timing of the switching of the three-way valve from closed to open, or the longer the open period, the greater the fuel injection rate will be.

A turbine 22 that converts the thermal energy of the exhaust into rotational energy, and a variable-capacity turbo-supercharger 21 connected coaxially with a compressor 23 for compressing the intake air, are provided in the exhaust path 2 of the downstream opening of the EGR path 4. A variable nozzle 24 (a variable geometry mechanism) driven by the actuator 25 is provided on the scroll inlet of the turbine 22, and the variable nozzle 24 is controlled by the engine controller 31 at a nozzle aperture (tilted condition) which will enhance the rate of flow of the exhaust introduced in the turbine 22 in a low rotational speed range, and at a nozzle aperture (a fully open condition) which will introduce the exhaust into the turbine 22 without resistance in a high rotational speed range, thereby acquiring predetermined charging pressure in a low rotational speed range.

The actuator 25 comprises a diaphragm actuator 26 that drives the variable nozzle 24 in response to the control pressure, and a pressure control valve (not shown) that adjusts the control pressure to the diaphragm actuator 26. The duty control signal is generated so that the actual aperture of the variable nozzle 24 becomes the target nozzle aperture, and this duty control signal is transmitted to the pressure control valve.

The engine controller 31, which receives signals from an accelerator sensor 32, a sensor 33 that detects the engine rotational speed and the crank angle, a coolant or water temperature sensor 34, an aero-flow meter 35, and a charging pressure sensor 36, detects the deceleration of the vehicle speed (means for detecting the deceleration of the vehicle) based on the above-mentioned signals, and carries out coordinated EGR control and charging pressure control so that the target EGR rate and the target charging pressure can be obtained. A description of the detailed control method is omitted because it is not directly related to the present control apparatus. In addition, when a predetermined condition is fulfilled during deceleration due to release of the acceleration pedal, a fuel cutoff control is exercised, that is, the fuel injection rate is reduced. When the engine rotational speed or the vehicle speed is reduced to a predetermined value, the fuel cutoff control (fuel cutoff recovery) is completed.

A post-exhaust process apparatus is provided in the exhaust path 2 downstream of the turbine 22 and comprises a $NO_x$ trap catalyzer 29 and a DPF (Diesel Particulate Filter) 28 that collects the PM (particulate matter) in the exhaust.

The $NO_x$ trap catalyzer 29 traps $NO_x$ (nitrogen oxides) in the exhaust during lean combustion and then reduces and purifies the trapped $NO_x$ using the HC and CO in the exhaust as the reduction agents during stoichiometric combustion and rich combustion.

When the $NO_x$ trapped during normal operation (lean combustion) reaches the limit of the tolerance level, and when it enters the area where the predetermined exhaust temperature can be secured, the engine controller 31 controls the air excess coefficient to create a rich combustion (rich spike), in order to reduce and purify the trapped $No_x$.

In addition, the $NO_x$ trap catalyzer 29 is contaminated by SOX (sulfur oxides) contained in the exhaust at a minute level. Therefore, when it is determined that the accumulation of $SO_x$ has reached the tolerance level limit, the air excess coefficient is controlled so that combustion becomes approximately stoichiometric in order to increase the exhaust temperature to the temperature at which this $SO_x$ is separated from the $NO_x$ trap catalyzer (sulfur detoxification).

When it is determined that the accumulation of PM in the exhaust has reached the tolerance level limit for DPF 28, the trapped PM is combusted; more particularly a DPF regeneration is carried out. As the pre-stage, the air excess coefficient is established so that the air-fuel ratio becomes slightly lean in order to increase the exhaust temperature to approximately 300° C. at which temperature the accumulated PM can be combusted (temperature increase).

As described above, it is necessary to obtain rich combustion in order to reduce the $NO_x$ trapped by the $NO_x$ trap catalyzer 29 (hereinafter simply referred to as "$NO_x$ reduction"), and to detoxify contamination by $SO_x$ in the $NO_x$ trap catalyzer 29 (hereinafter simply referred to as "sulfur detoxification"), so that combustion is switched from lean to rich or to stoichiometric combustion as required. However, since sometimes rich combustion or stoichiometric combustion cannot be obtained with only supercharger 21, an inlet throttle valve 18 is provided in the inlet path 3 immediately upstream from the collector 3a as shown in FIG. 1 and is driven by a diaphragm-type actuator 19 operating in correspondence with the control pressure from the pressure control valve (not shown) The structure of the actuator 19 is the same as that of the EGR valve 6, and the pressure control valve for the inlet throttle valve 18 is also driven by the duty control signal from the engine controller 31.

In addition, when a large amount of PM is accumulated and DPF regeneration is begun under the condition in which the DPF bed temperature is high, the DPF is overheated due to the rapid combustion of PM, whereby erosion may occur. Therefore, in order to prevent erosion, control moderating the PM combustion is effected by appropriately controlling the oxygen supply amount (hereinafter simply referred to as "erosion prevention"). The air excess coefficient is thereby controlled so that a rich combustion is generated.

In order to control the aperture of the variable nozzle 24 of the exhaust turbine 22 and the aperture of the inlet throttle valve 18 so that the target new-air air rate can be obtained, the inlet throttle valve 18 is controlled only in the area where the target new-air rate cannot be obtained by the supercharger 21 (for example, a low load area near idling) or the aperture of the variable nozzle and the aperture of the inlet throttle nozzle are simultaneously controlled regardless of the operation range. Either method is acceptable. An EGR device can be used as an intake air rate adjustment means.

In addition, since the operation for $NO_x$ reduction, sulfur detoxification, DPF regeneration, a temperature increase, and erosion prevention are carried out only when the predetermined conditions are established, these operations can be categorized as conditioned operations, and are distinguished from the normal operations in which lean operation can be carried out. A variety of transition methods from normal operation to conditioned operation, or vice versa have been publicly known, and the present embodiment performs, for example, control similar to that which is disclosed in Japanese Patent Application No. 2003-336520.

In the present embodiment, during the deceleration that accompanies the reduction of the fuel injection rate, the EGR valve 6, inlet throttle valve 18, variable nozzle 24 and fuel injection rate are controlled as set forth below.

Figure 2:
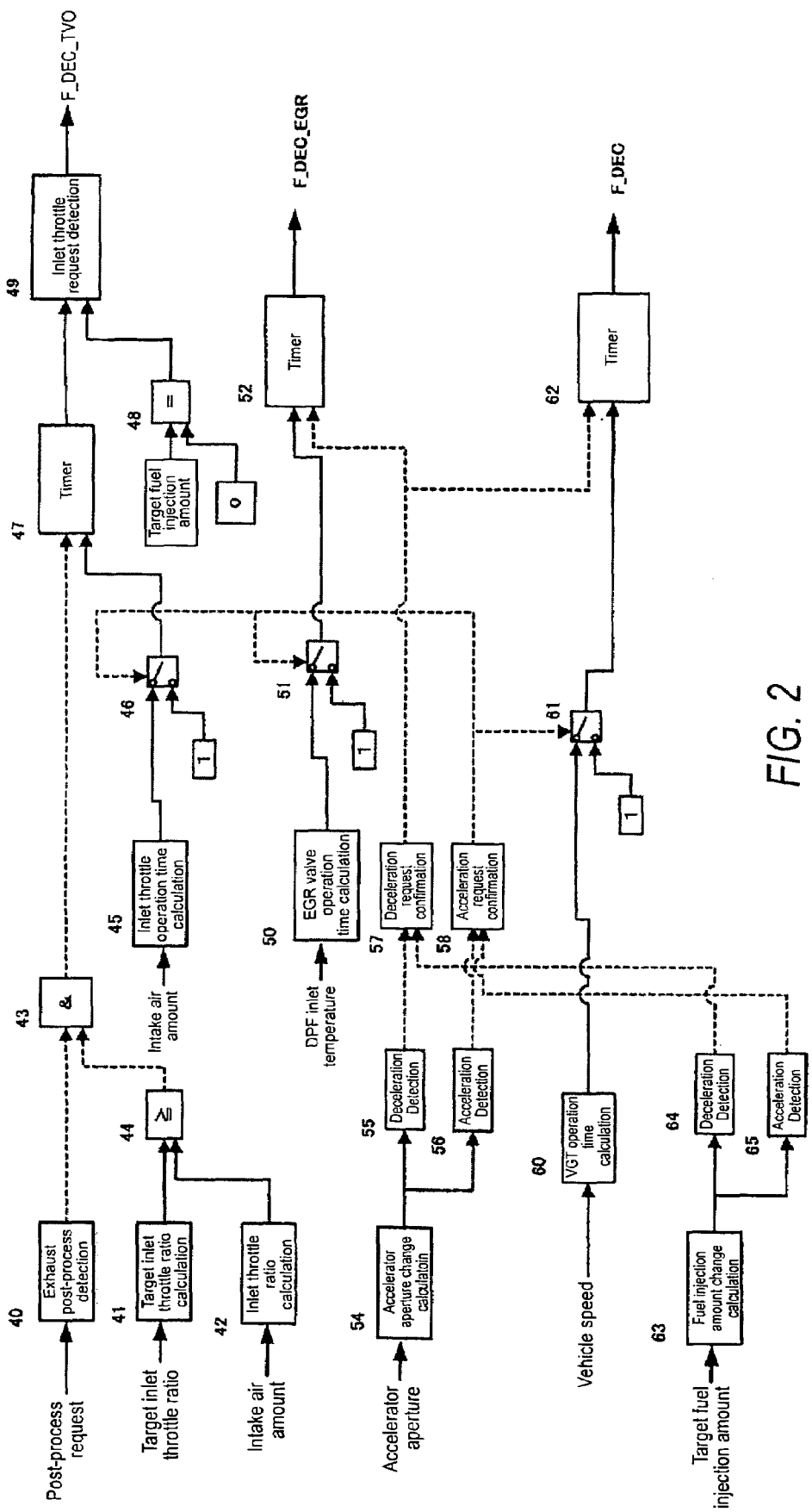
FIG. 2 is a block diagram of coordinated charging pressure control and EGR control during deceleration.

FIG. 2 is a block diagram that illustrates control of the present embodiment.

The post-exhaust process detector 40 determines whether the operation is normal or conditioned. Here normal operation is State 1, and of conditioned operation, $NO_x$ reduction is State 2, increase in temperature is State 3, sulfur detoxification is State 4, DPF regeneration is State 5, and erosion prevention is State 6. If the input state number is 1, normal operation is determined, and if the state number is 2 to 6, a conditioned operation is determined.

The target inlet throttle ratio TQHO is introduced in the target inlet throttle ratio calculator 41, and this is processed by taking the effect of hysteresis into account, so as to calculate the target inlet throttle ratio TQHOA.

Figure 10:
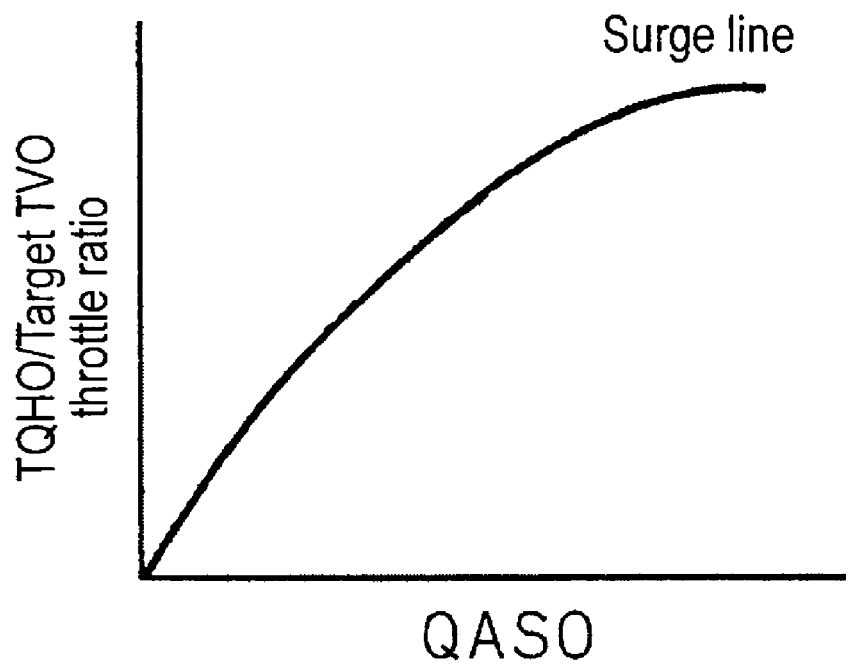
FIG. 10 is a target inlet throttle ratio graph.

The intake air rate QASO detected by an aero flowmeter 35 is introduced in the inlet throttle ratio calculator 42, so that the inlet throttle ratio QHOB corresponding to the above is calculated. More specifically, QHOB is obtained from a graph shown in FIG. 10, given the intake air rate QASO. FIG. 10 is the graph of the inlet throttle ratio, from which the compressor 23 may generate surging, relative to the intake air rate QASO. In the Figure, surging may be generated at an inlet throttle ratio that exceeds the surge line.

A throttle ratio detector 44 compares the target intake air throttle ratio QHOA with the intake air throttle ratio QHOB, and if the target intake air throttle ratio QHOA is greater, it returns true, and if smaller, it returns fault.

If the results from the post-exhaust process detector 40 are any of States 2 to 6 and the results from the throttle ratio detector 44 are true, then the timer operation detector 43 transmits a starting command to the timer 47.

Figure 3:
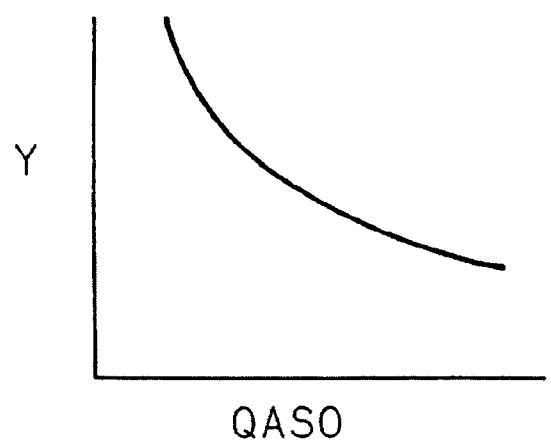
FIG. 3 is a delayed operation time graph of an inlet throttle valve.

An inlet throttle operation time calculator 45 calculates the delayed time Y relative to the operation requirement (inlet throttle requirement) of the inlet throttle valve 18 based on the input intake air rate QASO. More specifically, it is obtained by searching on the delayed time-intake air rate graph shown in FIG. 3, given the input intake air rate QASO. The delayed time Y found here is transmitted to the switch 46 and is equivalent to the time for execution of the fuel cutoff control.

The accelerator aperture change calculator 54 calculates an accelerator aperture change amount ΔAPO based on the detected value of the accelerator sensor 32. The accelerator aperture change amount ΔAPO is transmitted to the deceleration detector 55 and the acceleration detector 56, and compared with the determination indices established in advance, to detect the existence of a deceleration request or an acceleration request, and then the results are transmitted to the deceleration request confirmation portion 57 or the acceleration request confirmation portion 58.

In addition, a fuel injection rate calculator 63 calculates the amount of change ΔQF of the target fuel injection rate to be injected from the nozzle 17. The amount of change ΔQF of the target fuel injection rate is transmitted to the deceleration detector 64 and the acceleration detector 65 and, similarly to the deceleration detector 55 and acceleration detector 56, it is compared with the determination indices that are established in advance, and whether a deceleration request or an acceleration request exists or not is transmitted to the deceleration confirmation portion 57 or the acceleration request confirmation portion 58.

A fuel injection rate calculator 63 calculates the amount of change ΔQF of the target fuel injection rate injected from the nozzle 17. The amount of change ΔQF is transmitted to the deceleration detector 64 and the acceleration detector 65 and, similarly to the deceleration detector 55 and acceleration detector 56, it is compared with the determination indices that are established in advance, and whether a deceleration request or an acceleration request exists or not is transmitted to the deceleration confirmation portion 57 or the acceleration request confirmation portion 58.

The deceleration request confirmation portion 57 transmits the operation signal to a timer 53 and a timer 62, described below, and each of timers 53 and 62 starts when at least one of the deceleration detectors 55 and 64 has a deceleration request.

When at least one of the acceleration detectors 56 and 65 has an acceleration request, the acceleration request confirmation portion 58 transmits an operation signal to the switches 46, 51 and 61.

Figure 4:
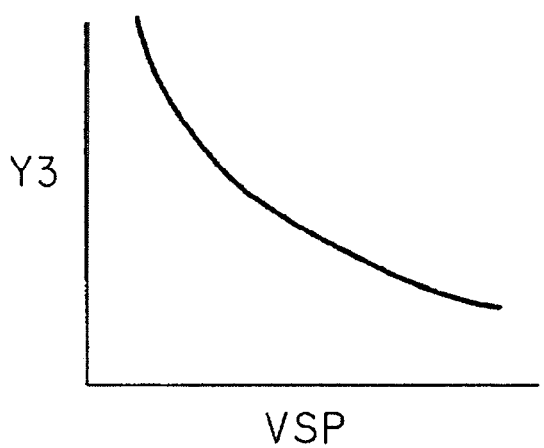
FIG. 4 is a delayed operation time graph of a variable nozzle.

A variable nozzle operation time calculator 60 calculates delayed time Y3 corresponding to the operation request of the variable nozzle 24 based on the input vehicle speed VSP. More specifically, it is obtained by searching on the delayed time-vehicle speed VSP graph shown in FIG. 4, given the input vehicle speed VSP. The delayed time Y3 found is transmitted to the switch 61.

Figure 5:
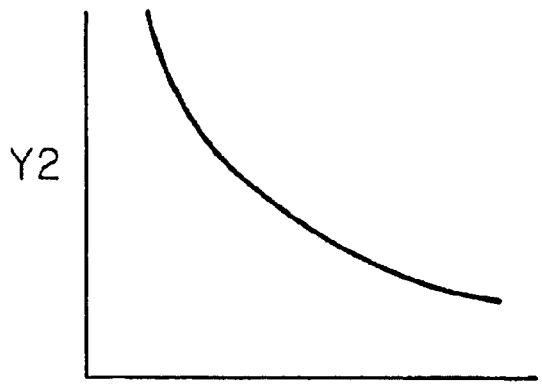
FIG. 5 is a delayed operation time graph of an EGR valve.

An EGR valve operation time calculator 50 calculates delayed time Y2 corresponding to the operation requirement of the EGR valve 6 based on the DPF inlet temperature received. More specifically, it is found by searching the delayed time-DPF inlet temperature graph shown in FIG. 5, given the input DPF inlet temperature. The delayed time Y2 found is transmitted to the switch 51.

When the operation signal is received from the acceleration request portion 58, the switches 46, 51, and 61 cancel the delayed times Y, Y2 and Y3. When an operation signal from the acceleration request portion 58 is not received, delayed time Y is transmitted from the switch 46 to the timer 47, delayed time Y2 to the timer 52, and delayed time Y3 to the timer 62.

The timer 47 is activated when a timer operation signal from the timer operation detector 43 and the delayed time Y from the switch 46 are received, and processing of the inlet throttle request F_DEC_TVOINI is delayed by the delayed time Y In addition, fuel cutoff detector 48 determines whether the fuel injection rate is zero or not, in other words, whether the fuel is cut off or not. If it is not cut off, it returns the inlet throttle request F_DEC_TVOINI=F_DEC_TVO, and if it is cut off, inlet throttle request detector 49 returns the inlet throttle request F_DEC_TVO=0, namely, an inlet throttle request is generated so that the inlet throttle valve 18 is fully open.

The timer 52 is activated when a deceleration request is received, and processing of an EGR valve operation request F_DEC_EGR is delayed by the delayed time Y2.

The timer 62 is activated when a deceleration request is received, and processing of a surge protection request F_DEC is delayed by the amount of delayed time Y3.

As described above, in the present embodiment an inlet throttle operation request and an EGR operation request are generated depending on the operating conditions during deceleration, so as to provides a delay time for the operation of the inlet throttle valve 18 and EGR valve 6, or to provide a surge prevention request and control the fuel injection rate and the aperture of the variable nozzle 24, as described below.

Descriptions of control of the EGR valve 6, inlet throttle valve 18, the fuel injection rate, and variable nozzle 24 are provided as set forth below.

Figure 6:
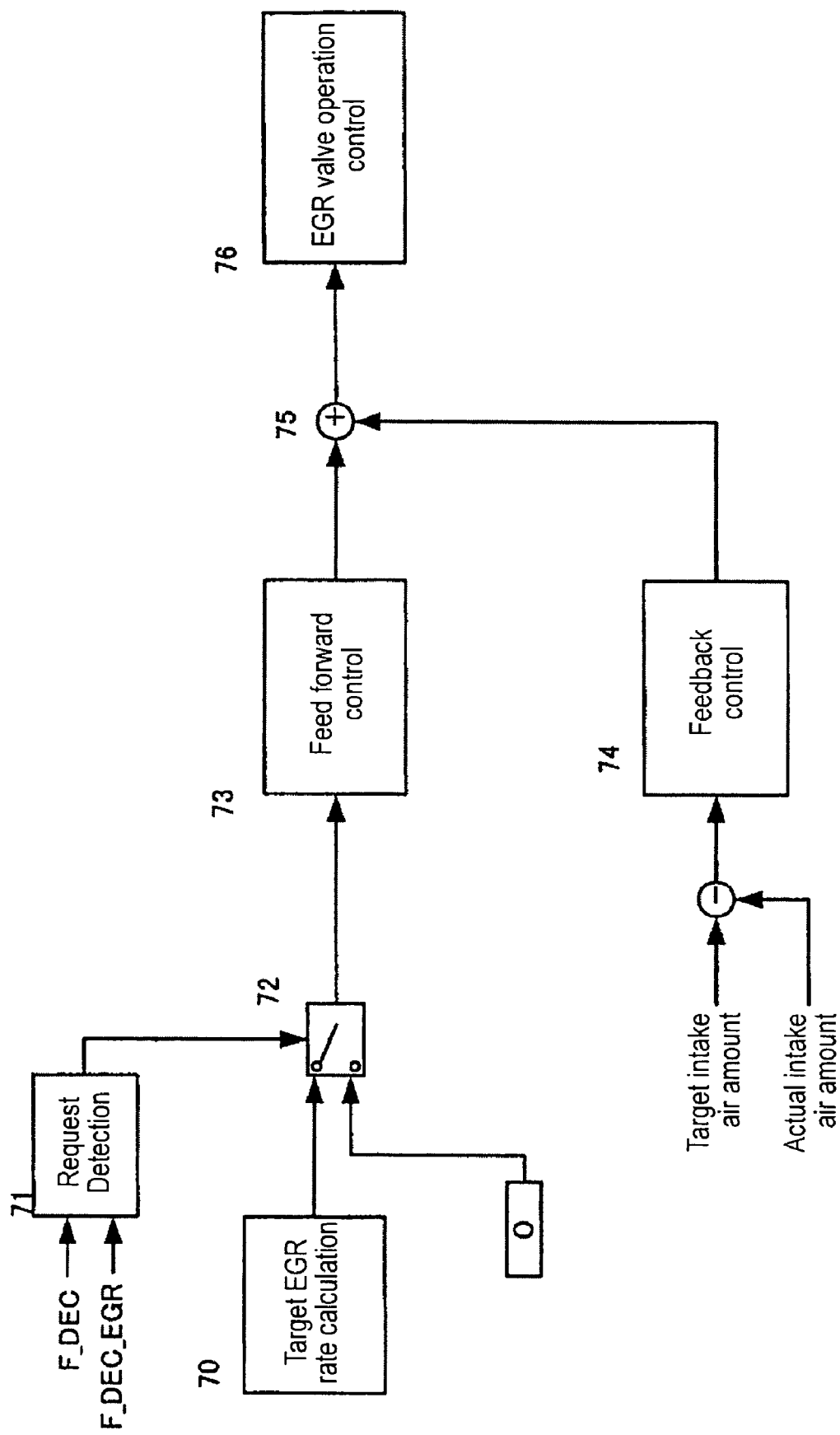
FIG. 6 is a block diagram of EGR valve operation control.

Control of the EGR valve 6 is described with reference to FIG. 6, which is a block diagram showing such control.

The target EGR calculator 70 calculates the target EGR rate based on the operating conditions. The request detector 71 determines whether either the EGR operation request F_DEC_EGR or the surge prevention request F_DEC has been provided. If there is no request, it generates the target EGR rate found by the target EGR rate calculator, and if there is a request, it operates the switch 72 and the signal "zero" that cancels the EGR to the feed forward controller 73. In other words, the EGR valve 6 is closed if either the EGR operation request F_DEC_EGR or surge protection request F_DEC is given.

The feed forward controller 73 calculates the aperture, etc., of the EGR valve 6 based on the input target EGR rate. The feed forward controller 74 calculates the feedback control amount based on the difference between the target intake air rate determined from the operating conditions and the actual intake air rate detected by the aero flowmeter 35, and feeds back the calculation results of the feed forward controller 73 by the adder 75. The EGR valve driving control 76 controls the means that drives the EGR valve 6 (for example, a step motor) based on the calculation results obtained by the adder 75. As described above, the difference between the target intake air rate and the actual intake air rate is fed back to the EGR valve aperture determined by the target EGR rate, thereby allowing control with greater precision.

Figure 7:
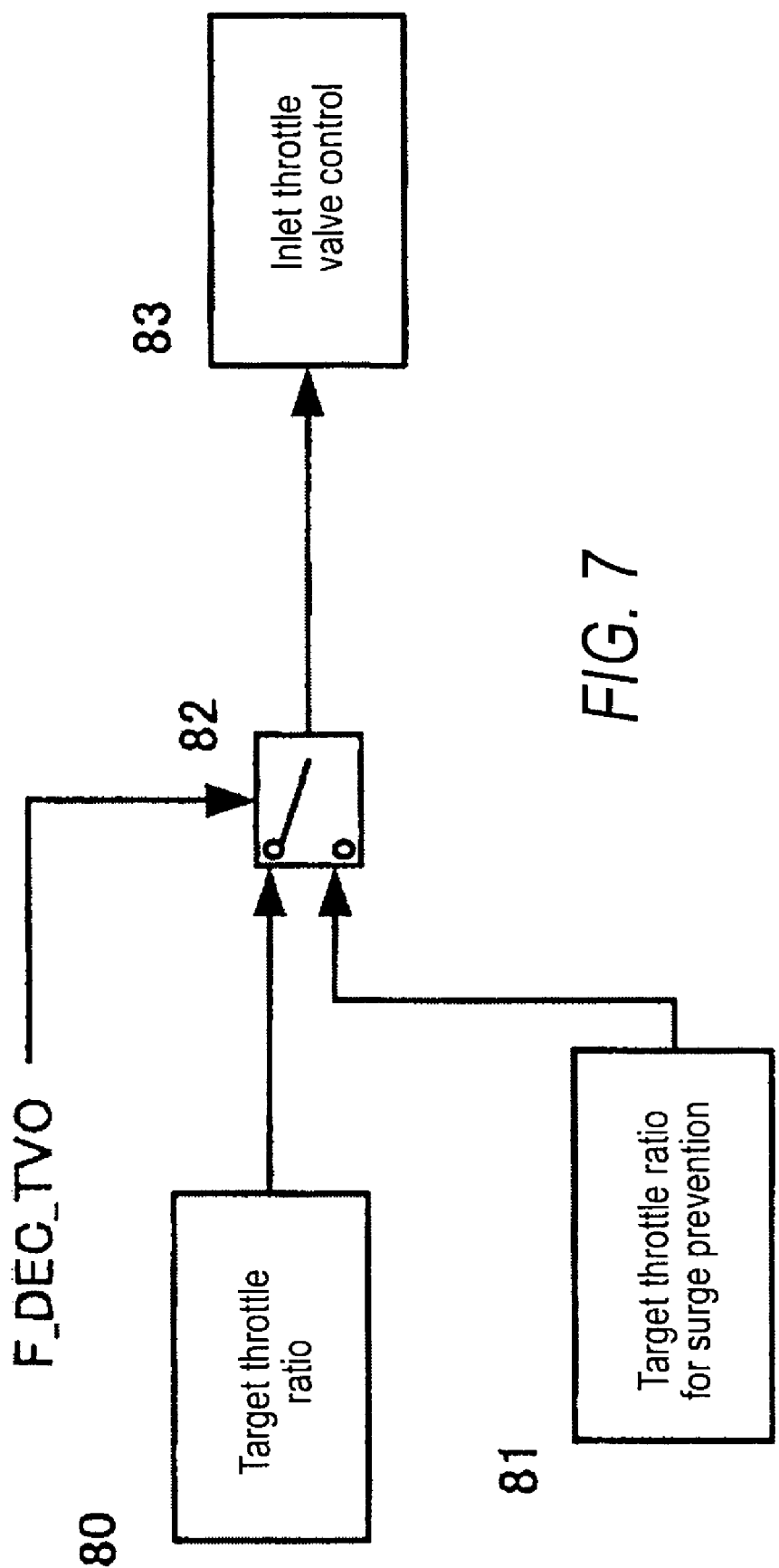
FIG. 7 is a block diagram of inlet throttle valve control.

Control of the inlet throttle valve 18 is described with reference to FIG. 7, which is a block diagram that shows such control.

The target throttle ratio calculator 80 calculates the target throttle ratio of the inlet throttle valve 18 based on the operation conditions of the post-exhaust process.

Figure 13:
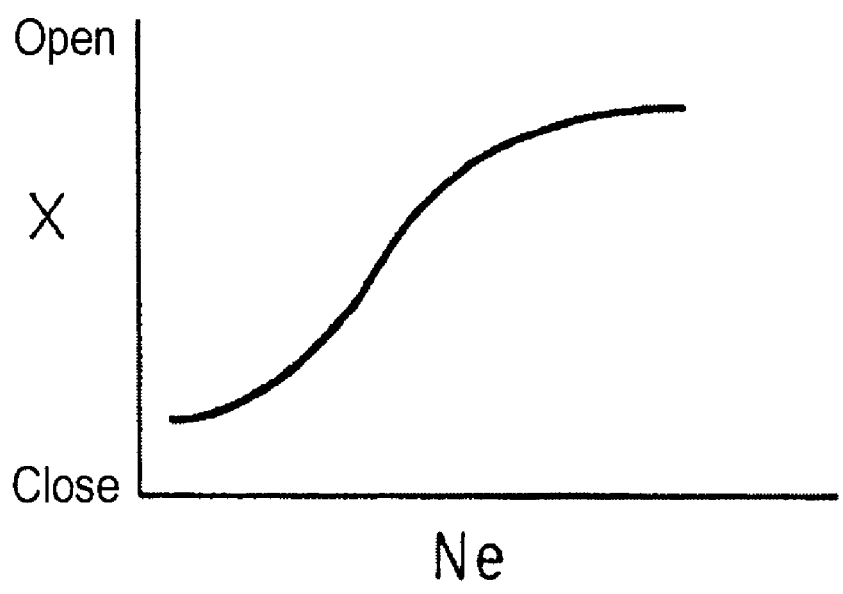
FIG. 13 is a target inlet throttle graph for surge prevention.

The surge prevention target throttle ratio calculator 81 calculates the inlet throttle ratio that prevents surging of the compressor 23 based on the rotational speed of the engine 1. More specifically, it searches the graph shown in FIG. 13 using the engine rotational speed. FIG. 13 is a graph in which the Y axis is the inlet throttle ratio and the X axis is the engine rotational speed.

A switch 82 is operative to select the throttle ratio for surge prevention when an inlet throttle operation request F_DEC_TVO is provided, and if it is not provided, the switch 82 selects the inlet throttle ratio calculated by the target throttle ratio calculator 80. Based on this, the inlet throttle valve controller 83 controls operation of the inlet throttle valve 18.

Figure 8:
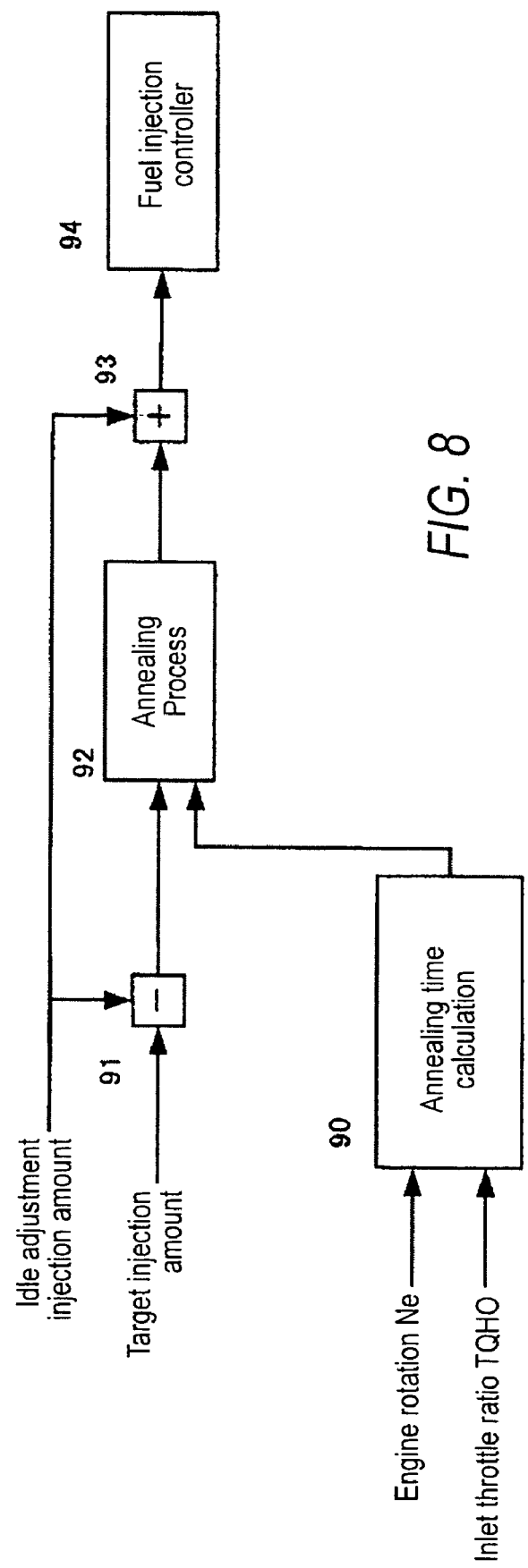
FIG. 8 is a block diagram of fuel injection rate control.

Control of the fuel injection rate is described with reference to FIG. 8, a block diagram showing such control.

Figure 11:
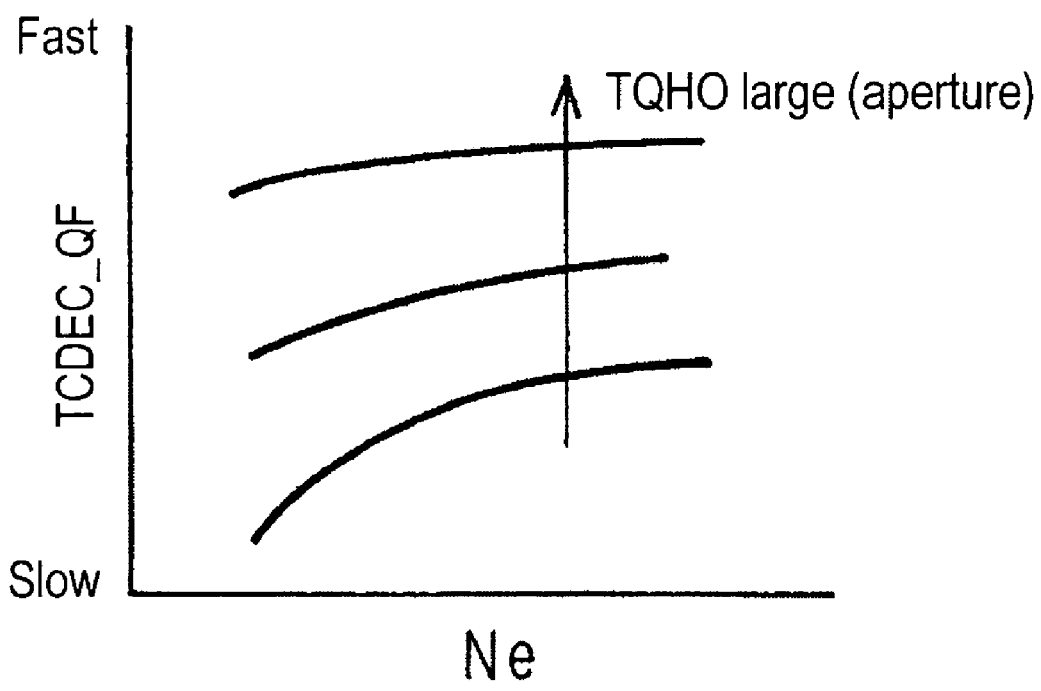
FIG. 11 is an annealing time graph.

Annealing time calculator 90 calculates the annealing time from the start of fuel injection until it reaches the target fuel injection rate. More specifically, it searches a graph as shown in FIG. 11 in which the aperture of the inlet throttle valve 18 is plotted, with the inverse number of the annealing time TCDEC_QF as the Y axis, using the engine rotational speed and the inlet throttle ratio, and the annealing time is calculated from the inverse number of the annealing time TCDEC_QF so obtained. The greater the inlet throttle ratio, the longer the annealing time.

The subtracter 91 subtracts the fuel injection rate (adjusted injection rate for idling) during idling from the target injection rate for the reason that the fuel injection rate during idling is not affected by changes in operating conditions and is approximately constant.

The annealing processor 92 carries out the annealing process for the injection rate calculated by the subtracter, based on the above-described annealing time. Then it is added to the adjusted injection rate for idling at the adder 93, and the adjusted target injection rate is obtained.

The fuel injection controller 94 effects fuel injection control based on the adjusted target injection rate.

Figure 9:
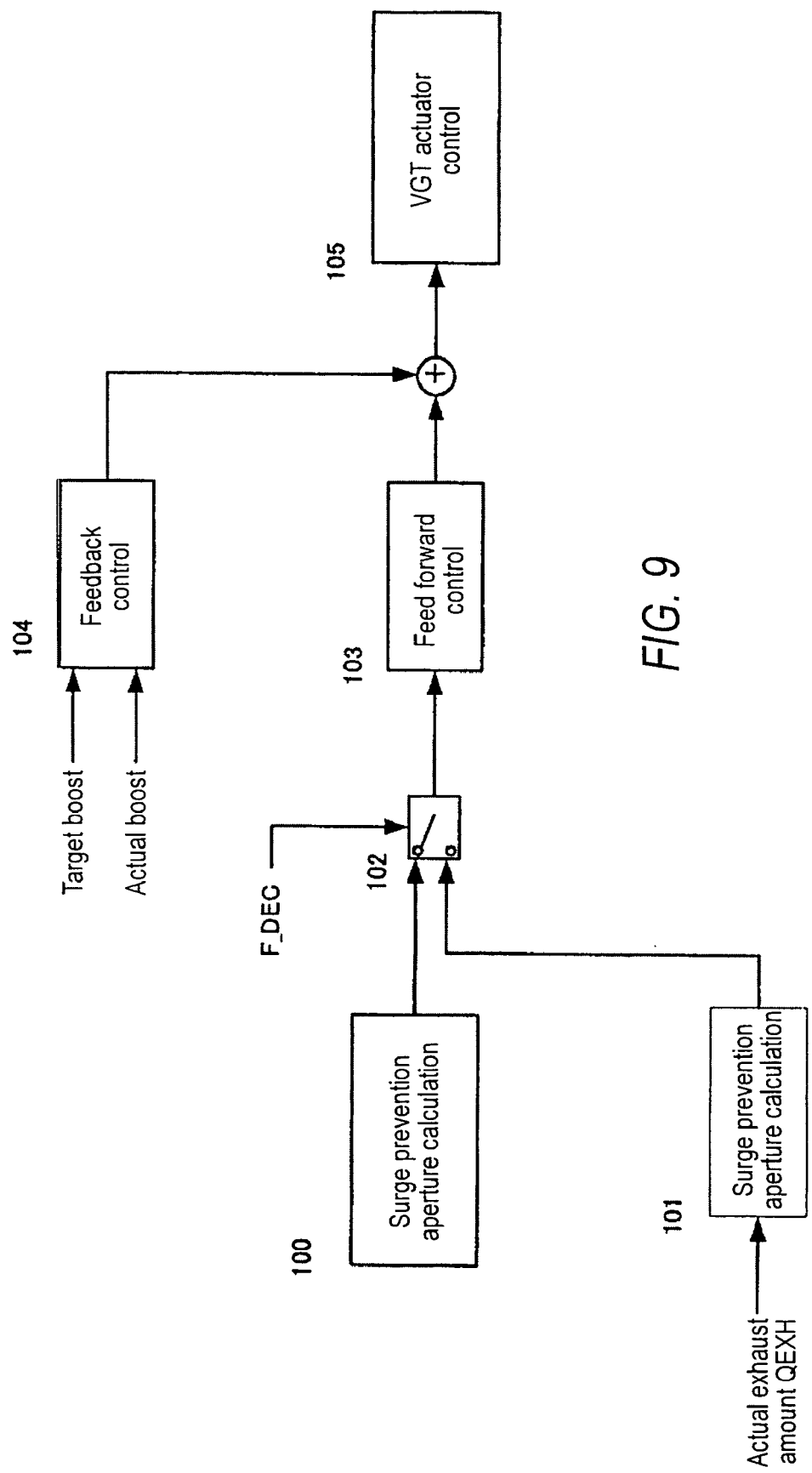
FIG. 9 is a block diagram of variable nozzle control.

The aperture control of the variable nozzle 24 is described with reference to FIG. 9, a block diagram showing such control The target nozzle aperture calculator 100 calculates the target nozzle aperture for normal driving conditions based on the actual exhaust rate QEXH of the engine 1.

The surge prevention aperture calculator 101 calculates the target nozzle aperture for surge prevention based on the actual exhaust rate QEXH.

Figure 12:
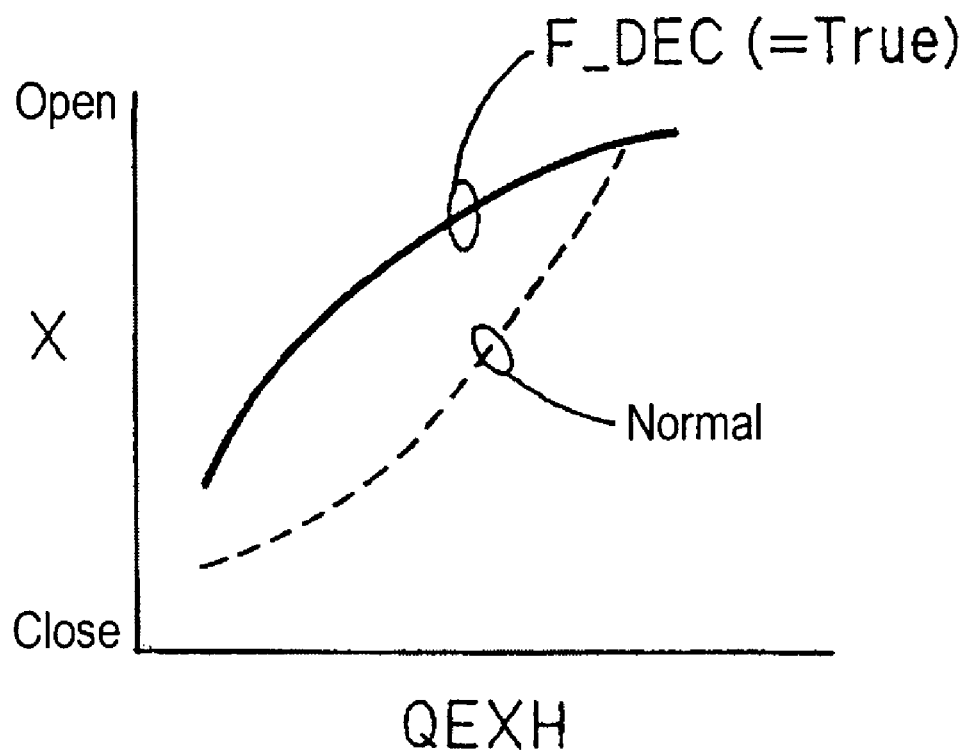
FIG. 12 is a variable nozzle aperture property graph.

The correlation between the target nozzle aperture and the actual exhaust rate QEXH is shown in the graph of FIG. 12. In FIG. 12, the y-axis is the nozzle aperture and the x-axis is the actual exhaust rate QEXH. In the Figure, the solid line shows the surge prevention aperture property and the dotted line shows the aperture property during normal driving conditions. As shown in the Figure, the target nozzle aperture for surge prevention is established so that it has a greater turbine capacity when there is a low exhaust flow rate compared to the target nozzle aperture during normal driving conditions.

A switch 102 is operative to select the surge prevention aperture when a surge prevention request F_DEC is provided, and the rest of the time it selects the nozzle aperture found by the target nozzle aperture calculator 100.

The feed forward controller 103 calculates the aperture of the variable nozzle 24 so that it becomes the nozzle aperture selected by the switch 102. The feedback controller 104 calculates the difference between the target pressure ratio and the actual pressure ratio and then carries out a calculation to feed back the difference to control the nozzle aperture.

The variable nozzle controller 105 controls the aperture of the variable nozzle 24 based on the calculation by the feed forward controller 103 added together with the calculation results provided by the feedback controller 104.

Figure 14:
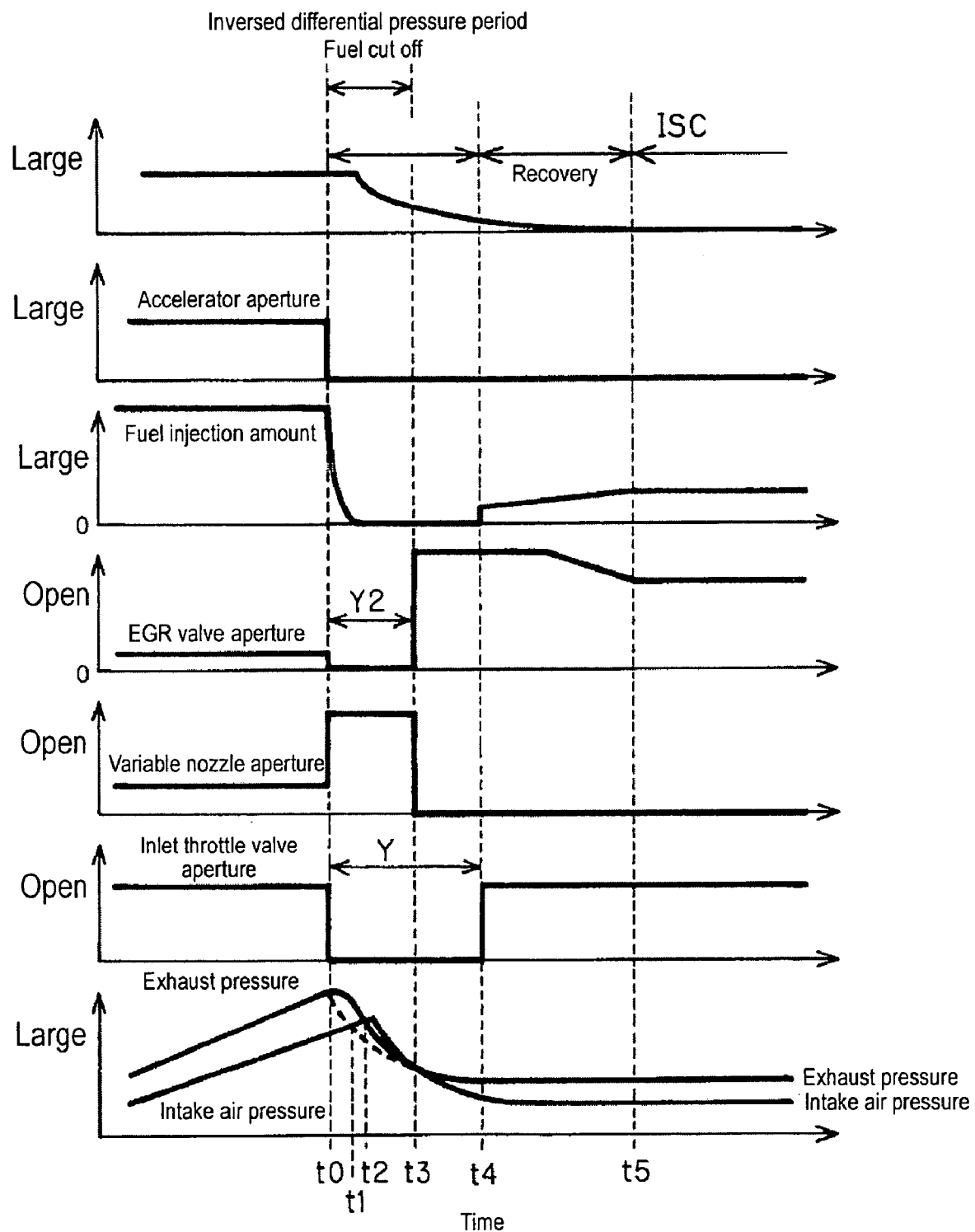
FIG. 14 is a time chart illustrating control in an embodiment.

The effect of such control is described with reference to FIG. 14, a time chart showing each of the aperture changes and fuel injection rate changes for EGR valve 6, inlet throttle valve 18, and variable nozzle 24, when control according to the present embodiment is carried out. In the graph, which shows the changes in the exhaust pressure at the bottom of the Figure, the solid line shows the condition upon execution of the present embodiment with annealing time, and the dotted line shows the same without annealing time at the start of the fuel cutoff.

When a constant speed driving condition is changed to a deceleration condition by operation of the accelerator pedal at t0, if predetermined conditions are met, such as that of the vehicle speed and the engine rotational speed, the so-called fuel cutoff control is effected, in which fuel injection is halted to improve mileage. The fuel cutoff control is released when predetermined fuel cutoff conditions are not met, such as when engine rotational speed is reduced to a predetermined number, or when vehicle speed is reduced to a predetermined value, and fuel injection resumes. The point at which fuel cutoff control is completed is indicated as t4. After fuel cutoff control is completed, the process proceeds through recovery control to prevent shocks, etc. at the resumption of fuel injection (t4 to t5), and then idling control (ISC) is carried out. Description of recovery control and ISC is omitted because they do not directly relate to the present control apparatus.

When fuel cutoff control begins, combustion is not effected in the cylinder and exhaust pressure begins to decrease. In contrast, decrease in intake air pressure is delayed compared to the decrease in exhaust pressure because of the intake air flow and the inertia of the compressor 23. Because of this, a period in which the exhaust pressure becomes lower than the intake air pressure is experienced during fuel cutoff control (inverse differential pressure period). When annealing time is not provided, the exhaust pressure rapidly decreases upon commencement of fuel cutoff control and the differential pressures t1 to t3 are inverted. According to the present embodiment, annealing time is provided until the fuel injection rate reaches zero, thereby allowing a moderate exhaust pressure reduction. t0 to t3 in the inverse differential pressure period.

The EGR valve 6 closes upon commencement of fuel cutoff control (t0) and opens upon completion of the inverse differential pressure period (t3). From t0 to t3 is equivalent to the delayed time Y2 found by the EGR valve operation time calculator 50 as in FIG. 2.

The variable nozzle 24 is controlled so that it opens upon commencement of fuel cutoff control (t0) and closes upon completion of the inverse differential pressure period (t3). From t0 to t3 is equivalent to the delayed time Y3 found by the variable nozzle operation time calculator 60 as in FIG. 2.

The inlet throttle valve 18 closes upon commencement of fuel cutoff control (t0) and opens upon completion thereof (t4). From t0 to t4 is equivalent to delayed time Y found by the inlet throttle operation time calculator 45 as in FIG. 2.

The effect of the present embodiment is summarized as follows.

The EGR valve 6 is closed upon commencement of fuel cutoff control, and therefore all the exhaust flows into the turbine 22 without branching out to the EGR path 4, thereby preventing a rapid reduction of the rotational speed of the turbine 22, and consequently, surging generated by the rapid decrease in gas flow passing through the compressor 23 can be prevented.

The EGR valve 6 is closed upon fuel cutoff control, and prevents the new intake air from flowing from the inlet path 3 to the exhaust path 2 via the EGR path 4 during the inverse differential pressure period when the exhaust pressure, reduced upon commencement of fuel cutoff control, becomes lower than the intake air pressure. By doing so, it prevents excess oxygen from being supplied to the post-exhaust processors 28 and 29, thereby preventing excessive increase in the temperature of the $NO_x$ trap catalyzer 28 due to excessive activation of the catalytic reaction because of an increase in oxygen concentration. In addition, the EGR gas flowing in the EGR path 4 does not backflow due to the rapid reduction of the exhaust pressure, and therefore surging noise generated due to backflowing EGR gas into the turbine 22 can be prevented.

The inlet throttle valve 18 is closed upon commencement of fuel cutoff control, thereby reducing the rate that gas flows in the exhaust path 2. During fuel cutoff control, the gas flowing into the exhaust path 2 is not combusted and has a low temperature, and therefore the post-exhaust processors 28 and 29 are cooled. The gas flow rate in the exhaust path 2 is reduced and thereby prevents reduction of purification efficiency due to excessive cooling of the post-exhaust processors 28 and 29.

Figure 15:
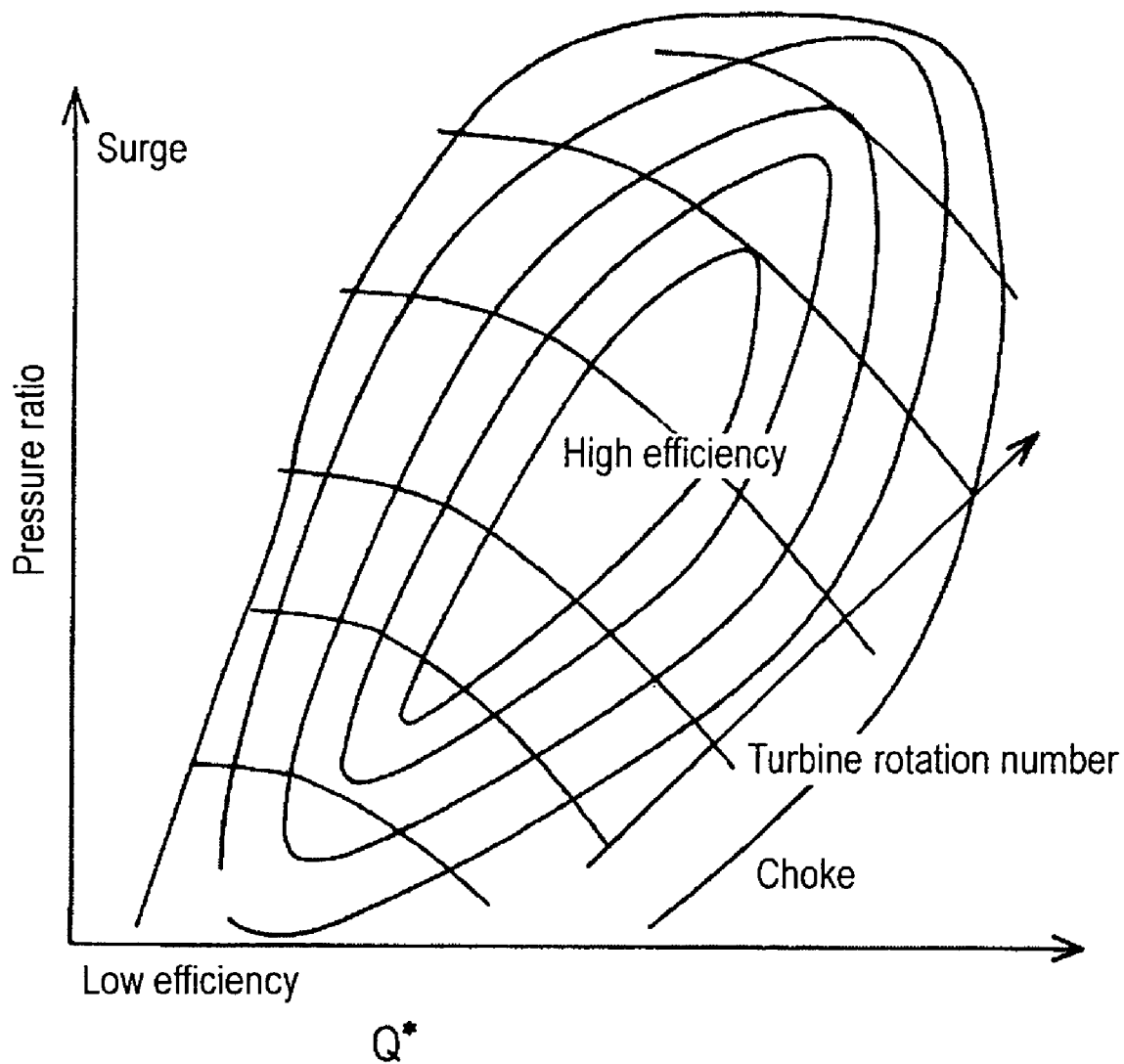
FIG. 15 is a compressor efficiency graph of a turbo-supercharger.

In addition, the variable nozzle 24 is controlled so that it opens upon commencement of fuel cutoff control. The efficiency of the compressor 23 of the variable capacity turbo-supercharger 21 is shown in FIG. 15 with the adjusted flow rate Q* (intake air rate that passes through the compressor) as the x-axis, and the pressure ratio (pressure ratio of the top and bottom flow of the compressor) as the y-axis. As is publicly known, if the compressor 23 compressing intake air is operated in the area outside (abnormal operation range) of the shaded portion (normal operation range) undesirable phenomena such as surging, choking, and over-speeding of turbine 22, are experienced, and therefore the operating condition of the compressor 23 should be established so that it does not enter the abnormal operation range. For example, during the rapid deceleration that accompanies fuel cutoff control, the rotational speed of the turbine 22, or more particularly, the rotational speed of the compressor 23, rapidly decreases and the adjusted flow rate Q* is reduced. In addition, the rate of reduction of the pressure ratio is moderate compared to the adjusted flow rate Q*. Therefore, the operational points move towards the left in FIG. 15, and sometimes jump into the abnormal operational range. In order to prevent this, in general, the aperture of the variable nozzle 24 is reduced in size so that it maintains the rotational speed of the compressor 23 even if the exhaust flow rate is reduced. However, when the inlet throttle valve 6 is closed, if the rotational speed of the compressor 23 is maintained, the pressure downstream of the compressor 23 may increase; in other words, the pressure ratio increases and sometimes jumps into the abnormal operational range.

Therefore, in the present embodiment, the generation of surging can be prevented by enlarging the aperture of the variable nozzle 24 upon commencement of fuel cutoff control, thereby reducing the rotational speed of the compressor 23.

The inlet throttle valve 18 is kept closed even after the differential pressure inverse period (t0 to t3) and until fuel cutoff control is completed, and the EGR valve 6 is opened and variable nozzle 24 is closed upon completion of the differential pressure inverse period. This prevents generation of surging due to a rapid increase in the intake air pressure when the inlet throttle valve 18 is opened.

The present control apparatus can be applied to a diesel engine with a post-exhaust processor.

While the present control apparatus has been described in connection with an embodiment thereof, this is by way of illustration and not of limitation, and the appended claims should be construed as broadly as the prior art will permit.

What is claimed is:

1. An engine control apparatus comprising:
   a turbo-supercharger driven by exhaust energy of an engine in a vehicle;
   an EGR (Exhaust Gas Recirculation) path interconnecting an exhaust path and an inlet path of the engine;
   an EGR valve for adjusting the flow rate of air passing through said EGR path;
   a deceleration condition detector for detecting deceleration of the vehicle;
   a fuel reduction control unit for reducing the rate of fuel injection when deceleration of the vehicle is detected;
   an inlet throttle valve in the inlet path, and
   wherein the EGR valve and the inlet throttle valve are operable to close during deceleration of the vehicle.

2. The engine control apparatus according to claim 1, wherein a period of deceleration of the vehicle is a period of inverse differential pressure from the time when the exhaust pressure in the exhaust outlet decreases with commencement of deceleration to becomes lower than inlet pressure at the inlet path, to the time when the exhaust pressure again becomes higher than the inlet pressure.

3. The engine control apparatus according to claim 1, wherein the deceleration condition detector is an accelerator sensor.

4. The engine control apparatus according to claim 3, wherein a period of deceleration of the vehicle is a period of inverse differential pressure from the time when the exhaust pressure in the exhaust outlet decreases with commencement of deceleration to becomes lower than inlet pressure at the inlet path, to the time when the exhaust pressure again becomes higher than the inlet pressure.

5. The engine control apparatus according to claim 1, wherein the fuel reduction control unit is operable to delay reduction of the rate of fuel injection for a predetermined period after commencement of deceleration of the vehicle.

6. The engine control apparatus according to 5, wherein a period of deceleration of the vehicle is a period of inverse differential pressure from the time when the exhaust pressure in the exhaust outlet decreases with commencement of deceleration to becomes lower than inlet pressure at the inlet path, to the time when the exhaust pressure again becomes higher than the inlet pressure.

7. The engine control apparatus according to claim 1, wherein the turbo-supercharger is a variable-capacitance turbo-supercharger equipped with a geometry variable mechanism operable to alter the geometry of the turbine, selectively enlarging the capacity of the turbo-supercharger during deceleration of the vehicle.

8. The engine control apparatus according to claim 7, wherein the inlet throttle valve is operable to remain closed until completion of fuel reduction control even after completion of the inverse differential pressure period.

* * * * *